US005391019A

United States Patent [19]

Morgan

[11] Patent Number: 5,391,019

[45] Date of Patent: * Feb. 21, 1995

[54] ENVIRONMENTAL ENCLOSURE STRUCTURE AND METHOD OF MANUFACTURE

[76] Inventor: J. P. Pat Morgan, P.O. Box 1089, St. George, Utah 84771

[*] Notice: The portion of the term of this patent subsequent to May 11, 2010 has been disclaimed.

[21] Appl. No.: 58,483

[22] Filed: May 6, 1993

Related U.S. Application Data

[63] Continuation-in-part of Ser. No. 757,813, Sep. 11, 1991, Pat. No. 5,209,603.

[51] Int. Cl.[6] ........ B65G 5/00

[52] U.S. Cl. ........ 405/128; 52/659; 264/256; 405/52; 588/249

[58] Field of Search ........ 405/128, 129, 52, 55; 52/659; 264/256, 109; 588/249, 256, 257

[56] References Cited

U.S. PATENT DOCUMENTS

| | | | |
|---|---|---|---|
| 14,273 | 2/1856 | Bartlett | 405/55 X |
| 3,378,617 | 4/1968 | Elmendorf | 264/256 X |
| 3,469,000 | 9/1969 | Smith | 264/256 X |
| 4,133,928 | 1/1979 | Riley et al. | 52/659 X |
| 4,372,906 | 2/1983 | del Valle | 264/256 |
| 4,450,128 | 5/1984 | Takeuchi | 264/256 X |
| 4,565,840 | 1/1986 | Kobayashi et al. | 52/659 X |
| 4,708,745 | 11/1987 | Schonhausen | 264/246 X |
| 4,784,821 | 11/1988 | Leopold | 264/256 X |
| 4,834,929 | 5/1989 | Dehoff et al. | 264/256 X |
| 5,030,033 | 7/1991 | Heintzelman et al. | 405/52 |
| 5,059,063 | 10/1991 | Sugimoto et al. | 405/132 X |

*Primary Examiner*—Dennis L. Taylor
*Attorney, Agent, or Firm*—Kenneth A. Roddy

[57] ABSTRACT

An environmental enclosure structure formed of a cement-based slurry infiltrated fiber composite material is used above ground or underground to enclose, protect, and safely contain; hazardous materials, telecommunications equipment, volatile explosives, and the like. The preferred enclosure structure is a box-like enclosure formed of a cement-based slurry infiltrated fiber composite material which is produced by first placing a plurality of individual short fibers or fiber mats of organic or inorganic materials into a form to create a bed of fibers substantially filling the form and having a predetermined fiber volume density and then adding a cement-based slurry mixture into the form to completely infiltrate the spaces between the fibers. The cement-based slurry mixture includes a composition of Portland cement, fly ash, water, a high-range water reducer (superplasticizer), and may also include fine grain sand, chemical admixtures, and other additives. Due to its fiber volume density and method of manufacture, the resulting structure has thinner walls, greater strength, and a gross weight significantly less than conventional reinforced and pre-stressed concrete structures of the same size, and a much higher bending capacity approximating that of structural steel.

28 Claims, 8 Drawing Sheets

ENVIRONMENTAL ENCLOSURE STRUCTURE AND METHOD OF MANUFACTURE

CROSS REFERENCE TO RELATED APPLICATION

This application is a continuation-in-part of U.S. patent application Ser. No. 07/757,813, filed Sep. 11, 1991, now U.S. Pat. No. 5,209,603.

BACKGROUND OF THE INVENTION

1. Field of the Invention

This invention relates generally to environmental enclosures, and more particularly to an improved environmental enclosure structure formed of a cement-based slurry infiltrated fiber composite material wherein the walls contain a mass of short fibers or fiber mats of organic or inorganic materials having a predetermined fiber volume density completely infiltrated in a cement-based matrix mixture.

2. Brief Description of the Prior Art

Enclosure structures such as: secondary containment vaults for hazardous materials; underground storage vaults; controlled environment vaults for housing communication equipment ( telephone, computer, surveillance, etc. ); and high security vaults for storing volatile explosives, nuclear weapons, test devices, and weapons components, are usually fabricated using conventional reinforced and pre-stressed concrete.

To meet the structural design requirements for resisting hydrostatic loads, soil pressures, explosions, or concussion, the walls of the vaults are generally quite thick. Some of these structures are monolithic which requires that they be fabricated on the installation site, since the thickness of the walls and conventional steel reinforced concrete construction produces a structure which is too heavy to be transported or shipped as a single unit. As a result, many of these types of structures are manufactured in panels or sections and then transported and assembled at the installation site. To develop the required structural capacity of the vault wall, and to insure a leak-free joint between the sections, cables are sometimes used to draw the sections together after the components have been assembled and rubber gaskets and caulking are employed to make the joints leak free.

In the past, materials such as petroleum products, chemicals, and hazardous materials have been stored in large metal or fiberglass tanks which are buried underground. Most of these "underground fuel storage tanks" (UFST) are prone to leakage due to being subjected to the hydrostatic forces of ground water, physical stresses associated with ground movement, and the corrosive action of soil environments. These steel tanks are known to begin failing leakage tests or to begin leaking at a much greater frequency after about twelve years in operation. Great damage to the environment and personal injury often results when the leaked materials enter the soil or ground water.

The United States Environmental Protection Agency (EPA) has recently adopted new regulations for Underground Fuel Storage Tanks (UFST) in response to the growing awareness of the damage caused by releases from the UFST's. These regulations will require UFST owners to spend significant sums of money over the life of the storage tanks for monitoring, reporting, and corrective actions. Failure to comply with the EPA regulations could result in having to take the storage tank out of service, and the possibility of financial liability for property damage and personal injuries. The EPA has estimated that more than $69 billion will be spent over the next 30 years on UFST systems in leak detection, inspections, upgrading, and corrective actions.

One method to comply with the EPA regulations is to place the fuel storage tank inside a buried "secondary containment vault". The secondary containment vault is a box-like structure having an interior volume greater than the capacity of the tank it contains. Such a system provides the ability to easily monitor the tank for leakage. Should a leak occur, the secondary containment vault will completely contain the leak, preventing the fuel from entering the soil or ground water. The secondary containment vault also isolates the fuel tank from soil and hydrostatic pressures and the corrosive action of many soils. Fuel tanks which are situated in secondary containment vaults in a manner to allow physical inspection are specifically excluded from EPA and most state regulations.

Most underground secondary containment vaults currently available are fabricated using conventional reinforced and pre-stressed concrete. To meet the structural design requirements for resisting hydrostatic and soil pressures, the walls of the vaults are generally from 8 to 10 inches thick. This produces a structure which is too heavy to be transported or shipped as a single unit. As a result, most conventional secondary containment vaults are manufactured in three parts; a monolithic lower section, an upper section, and a roof slab for the upper section. The roof slab is manufactured in several panels. To develop the required structural capacity of the vault wall, and to insure a leak-free joint between the lower and upper sections, post tensioned cables are used to draw the two sections together after the components have been assembled in the excavation. Rubber gaskets and caulking are employed to make the joint leak free. Such a secondary containment vault is manufactured by Unisil of Reston, Va.

Controlled environment vaults are box-like structures which are used for housing communication equipment, such as telephone, computer, or surveillance equipment, etc., which requires a controlled environment for proper operation. The controlled environment vaults may contain temperature control equipment, dehumidifiers, fresh air blowers, environment monitors and alarms, and electrical control panels and outlets, etc. The controlled environment vaults may be partially buried with an entry hatch above ground. Controlled environment vaults range in size from about 17′–25′ in length, 7′–12′ in height, and 10′–12′ in width. A controlled environment vault of conventional steel reinforced concrete in the smaller size has a weight of 70,000 lbs, and the larger size weighs about 140,000 lbs, with a concrete strength of 5,000 psi.

High security vaults constructed of conventional reinforced concrete are used for storing volatile explosives, nuclear weapons, test devices, and weapons components, where high strength and security is a factor.

Utility Vault Company, Inc., of Chandler, Ariz. manufactures secondary containment vaults, and controlled environment vaults which are constructed of conventional steel reinforced concrete.

There are several patents which disclose various fiber reinforced concrete structures.

U.S. Pat. No. 3,429,094 to Romualdi discloses a two-phase concrete and steel material comprising closely spaced short wire segments uniformly distributed randomly in concrete wherein the average spacing between wire segments is not greater than 0.5 inches.

Fleischer et al, U.S. Pat. No. 4,257,912 discloses a system for fixed storage of spent nuclear fuel having activated fission products contained within a metallic fuel rod housing which comprises a uniform concrete contiguously and completely surrounding the metallic housing which has metallic fibers to enhance thermal conductivity and polymers to enhance impermeability for convectively cooling the exterior surface of the concrete.

Lankard et al, U.S. Pat. No. 4,559,881 discloses a burglar resistant security vault formed of prefabricated steel fiber reinforced concrete modular panels wherein Portland Cement, fly ash, fine aggregate, gravel and water are mixed for an extraordinarily long period of time and they remain a mass of crumbly, damp, powder and aggregate until the superplasticizer admixture is added, at which time the mixture reaches a fluid state. Steel fibers are then added to the mixture and mixing continues until the mixture including the steel fibers is poured into a mold cavity.

Double et al, U.S. Pat. No. 4,780,141 discloses a cementious composite material containing metal fiber which particularly formulated to have high strength and a high degree of vacuum integrity at high temperatures. The composite comprises a high strength cement matrix and a filler component comprising a metal fiber having a length of about 0.05 mm. to about 5 mm. (about 0.02" to about 0.20"). The metal fiber filler is mixed with the cement matrix at a high vacuum to minimize air bubbles and then the liquid mixture (including metal fiber) is poured into the mold.

Heintzelman et al, U.S. Pat. No. 5,030,033 discloses a conventional concrete underground .storage vault comprised of a plurality of concrete sections sealingly secured together with grout keys and joint wrap. A fluid and material resistant (epoxy) coating is applied to the interior surfaces and an inert gas atmosphere is maintained within the vault to inhibit influx of oxygen and moisture. There is no teaching in Heintzelman of the type of concrete used, other than "precast concrete" or "steel and/or concrete".

Riley et al, U.S. Pat. No. 4,133,928 discloses a composite cementious or gypsum matrix material having precombined absorbent fibres and reinforcing fibre embedded therein. The absorbent fibres are selected from the group consisting of cotton, wool, cellulose, viscose rayon, and cuprammonium rayon, with the reinforcing fibers being selected from the group consisting of glass, steel, carbon, polyethylene and polypropylene. The fibre combinations are impregnated with portland cement or gypsum. Riley et al teaches a steel wire/cotton yarn reinforced concrete made by loom weaving a tape or felt having ten ends per inch for each fibre in both the longitudinal (warp) and cross (weft) directions then passing the tapes through a portland cement mortar slurry consisting of one part water, two parts cement, three parts sand by weight, and then winding the tapes into a mold and placing the mold in a curing room for one month.

As described hereinafter, the present invention utilizes a "cement-based slurry infiltrated fiber composite" construction which is significantly different from conventional "steel bar reinforced concrete" "steel fiber reinforced concrete" and "pre-stressed concrete", in both its fiber volume density and in the manner in which it is made. The "cement-based slurry infiltrated fiber composite" described hereinafter overcomes the disadvantages of conventional concrete constructions and produces a structure which has thinner walls and a gross weight significantly less than conventional reinforced and pre-stressed concrete structures of the same size and has the same or greater strength characteristics, and a much higher bending capacity approximating that of structural steel.

The present invention is distinguished over the prior art in general, and these patents in particular by an environmental enclosure structure formed of a cement-based slurry infiltrated fiber composite material which is used above ground or underground to enclose, protect, and safely contain; hazardous materials, telecommunications equipment, volatile explosives, and the like. The preferred enclosure structure is a box-like enclosure formed of a cement-based slurry infiltrated fiber composite material which is produced by first placing a plurality of individual short fibers or fiber mats of organic or inorganic materials into a form to create a bed of fibers substantially filling the form and having a predetermined fiber volume density and then adding a cement-based slurry mixture into the form to completely infiltrate the spaces between the fibers. The cement-based slurry mixture includes a composition of Portland cement, fly ash, water, a high-range water reducer (superplasticizer), and may also include fine grain sand, chemical admixtures, and other additives. Due to its fiber volume density and method of manufacture, the resulting structure has thinner walls, greater strength, and a gross weight significantly less than conventional reinforced and pre-stressed concrete structures of the same size, and a much higher bending capacity approximating that of structural steel.

SUMMARY OF THE INVENTION

It is therefore an object of the present invention to provide an environmental enclosure structure formed of a cement-based slurry infiltrated fiber composite material which has thinner walls, greater strength, and a gross weight significantly less than conventional reinforced and pre-stressed concrete structures of the same size.

It is another object of this invention is to provide an environmental enclosure structure which can be built at a remote location and transported or shipped as a single unit.

Another object of this invention is to provide an environmental enclosure structure which can be built in sections at a remote location which are easily transported and erected at the installation site.

Another object of this invention is to provide a method of manufacturing environmental enclosure structures of a cement-based slurry infiltrated fiber composite material which have thinner walls, greater strength, and a gross weight significantly less than conventional reinforced and pre-stressed concrete structures of the same size.

Another object of the present invention to provide an environmental enclosure structure for protecting storage tanks containing materials such as petroleum products, chemicals, and hazardous materials.

Another object of this invention is to provide an controlled environment vault for housing communication equipment, such as telephone, computer, or surveillance equipment, etc., which require a controlled environment.

Another object of this invention is to provide an environmental high security utility building for storing volatile explosives and weapons which is substantially impenetrable.

Another object of this invention is to provide a secondary containment vault system for isolating material storage tanks which is formed of cement-based slurry infiltrated fiber composite material having thinner walls, greater strength, and a gross weight significantly less than conventional reinforced and pre-stressed concrete vaults of the same size.

Another object of this invention to provide an environmental enclosure structure for use underground to isolate storage tanks containing harmful materials from the hydrostatic forces of ground water, physical stresses associated with ground movement, and the corrosive action of soil environments.

A further object of this invention is to provide an environmental enclosure structure for isolating material storage tanks which, in the event of tank leakage, will completely contain the leak and prevent the leaked materials from entering the soil or ground water.

A still further object of this invention is to provide an environmental enclosure structure for use underground in isolating material storage tanks which will effectively prevent intrusion of ground water into the structure.

Other objects of the invention will become apparent from time to time throughout the specification and claims as hereinafter related.

The above noted objects and other objects of the invention are accomplished by an environmental enclosure structure formed of a cement-based slurry infiltrated fiber composite material which is used above ground or underground to enclose, protect, and safely contain; hazardous materials, telecommunications equipment, volatile explosives, and the like. The preferred enclosure structure is a box-like enclosure formed of a cement-based slurry infiltrated fiber composite material which is produced by first placing a plurality of individual short fibers or fiber mats of organic or inorganic materials into a form to create a bed of fibers substantially filling the form and having a predetermined fiber volume density and then adding a cement-based slurry mixture into the form to completely infiltrate the spaces between the fibers. The cement-based slurry mixture includes a composition of Portland cement, fly ash, water, a high-range water reducer (superplasticizer), and may also include fine grain sand, chemical admixtures, and other additives. Due to its fiber volume density and method of manufacture, the resulting structure has thinner walls, greater strength, and a gross weight significantly less than conventional reinforced and pre-stressed concrete structures of the same size.

DESCRIPTION OF THE PREFERRED EMBODIMENTS

Figure 1:
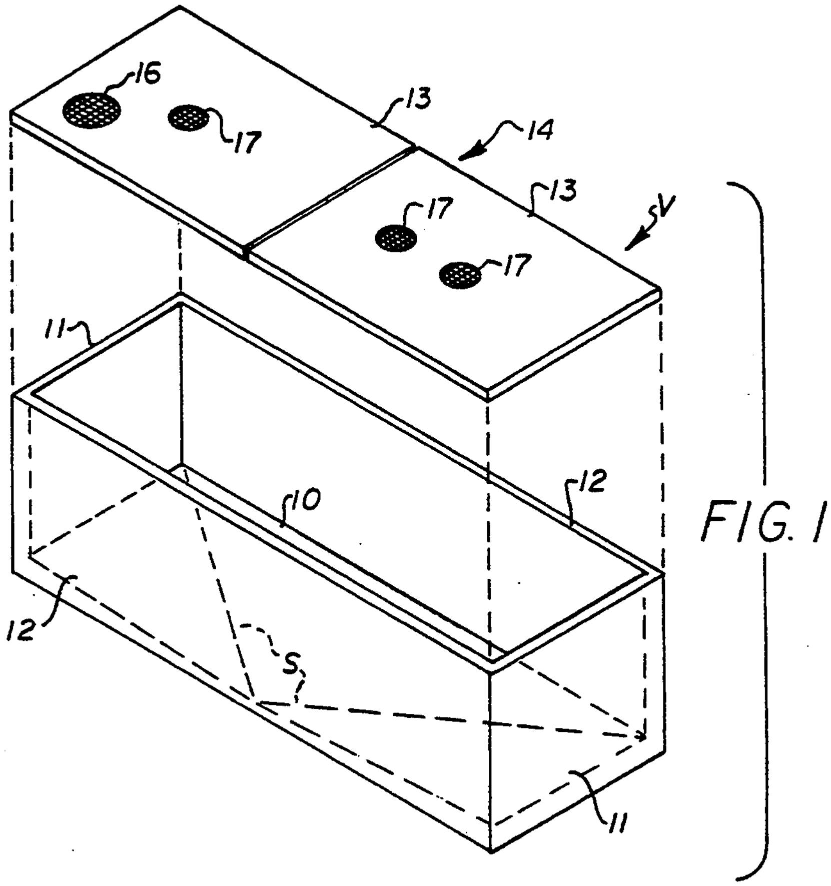
FIG. 1 is an exploded isometric view of a secondary containment vault enclosure in accordance with the present invention.
Figure 2:
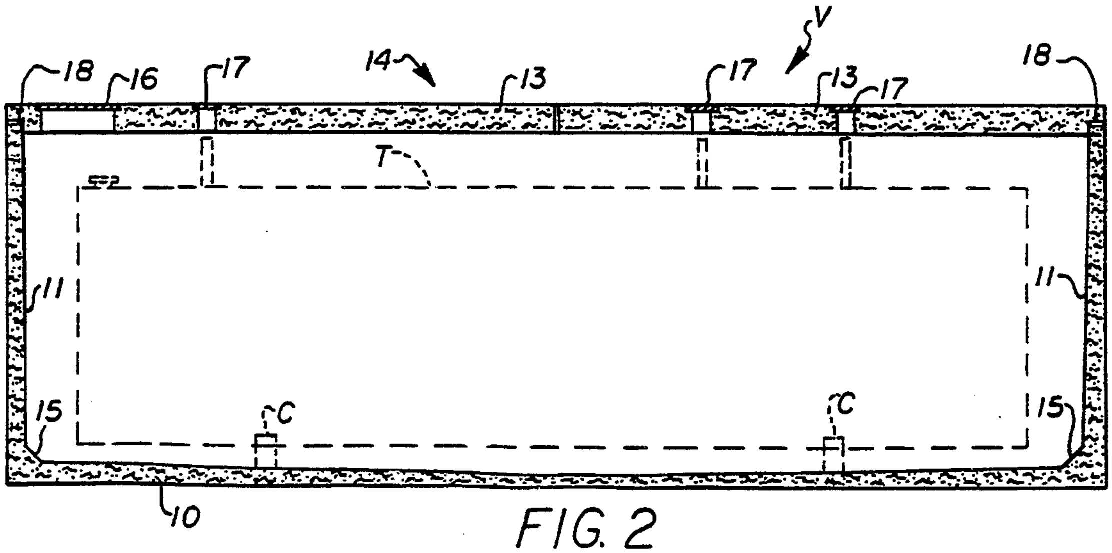
FIG. 2 is longitudinal cross section of the secondary containment vault of FIG. 1.
Figure 3:
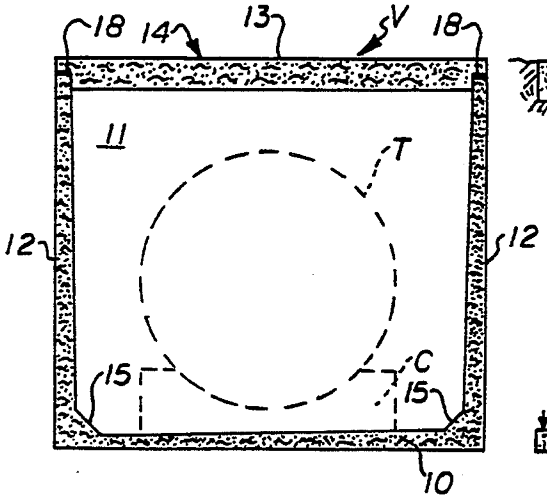
FIG. 3 is a transverse cross section of the secondary containment vault of FIG. 1.

Referring to the drawings by numerals of reference, there is shown in FIGS. 1, 2, and 3, a preferred secondary containment vault V. The vault V is a box-like structure which may be buried underground or may be used above ground. The preferred vault is a monolithic structure having a bottom wall 10, opposed end walls 11, and opposed side walls 12. A plurality of separate panels 13 form the roof slab 14. A vault in accordance with the present invention used for protecting fuel tanks may typically be approximately 10 feet tall, 12 feet wide, and 32 feet in length. However, it should be understood that the vault may be made in various sizes depending upon the particular application and a single roof slab may be used.

In the example illustrated, a fuel storage tank T is placed inside the vault V and supported above the floor 10 on cradles C. The vault has an interior volume greater than the capacity of the tank it contains such that in the event a leak should occur, the secondary containment vault V will completely contain the leaked materials.

The inside corners 15 at the juncture of the bottom wall 10 and the walls 11 and 12 of the vault V may be angled approximately 45° for a distance of about 6" above the bottom wall. As represented in dotted line S in FIG. 1, the top surface of the bottom wall 10 slopes from each end wall 11 and one side wall 12 inwardly and toward the opposed side wall to facilitate drainage of any leaked material.

The panels 13 forming the roof 14 are placed on top of the open end of the vault V and may be provided with various apertures, such as manhole access ports 16 which allow access to the interior by workers to conduct testing or other operations inside the vault. The panels 13 may also be provided with additional apertures 17 to access various fittings on the primary tank, such as monitoring equipment, vapor recovery tubes, drop tubes, gauging tubes, and pump manifolds, etc. The apertures are provided with cover plates. Suitable seals or gaskets 18 are installed between the top surface of the walls 11,12 and the bottom surface of the panels 13.

Figure 4:
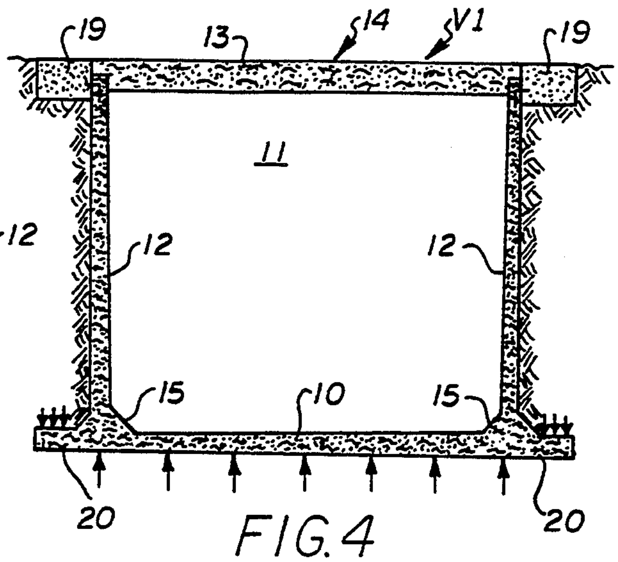
FIG. 4 is a transverse cross section of an alternate embodiment of the secondary containment vault.

Because the vault V is made of a cement-based slurry infiltrated fiber composite material, its total weight is substantially less than conventional reinforced or prestressed concrete structures of the same size, and it may be desirable in some underground installations to modify the structure to prevent up-lift due to buoyant conditions. Such an embodiment V1 is shown in FIG. 4.

The vault V1 is provided with a concrete beam 19 surrounding the top edge of the walls 11,12 of sufficient weight to prevent the vault from floating in a high ground water condition. A similar beam may also be provided at the base of the structure. The vault V1 may also be modified by extending the bottom wall 10 outwardly from the walls 11,12 to provide a peripheral base extension 20. When the vault V1 is buried, the weight of the earth on the base extension 20 will aid in reducing the buoyancy effect. The base extension 20 will also reduce the bending forces in the bottom wall 10 and walls 11,12, to some extent.

Figure 5:
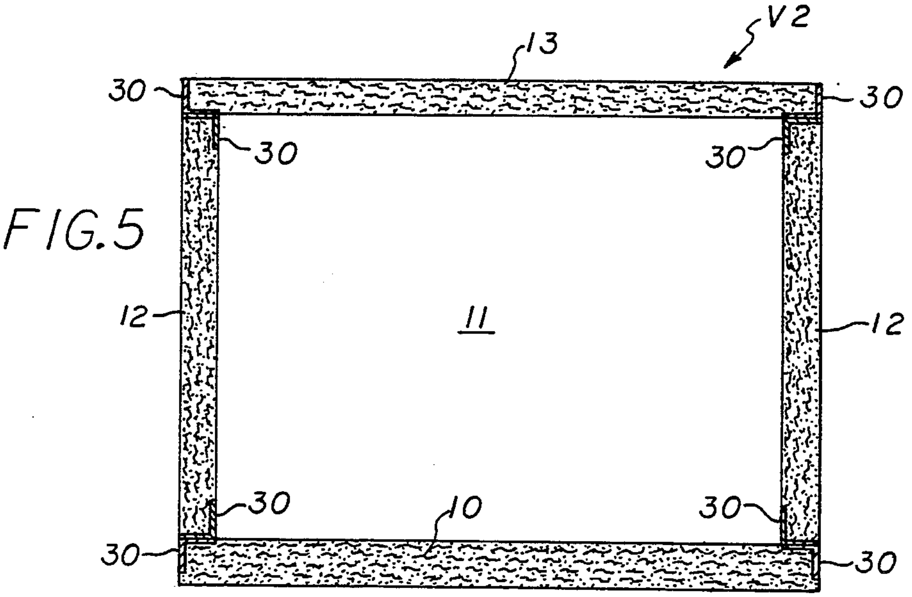
FIG. 5 is a transverse cross section of an alternate embodiment of a modular enclosure constructed of panels.
Figure 6:
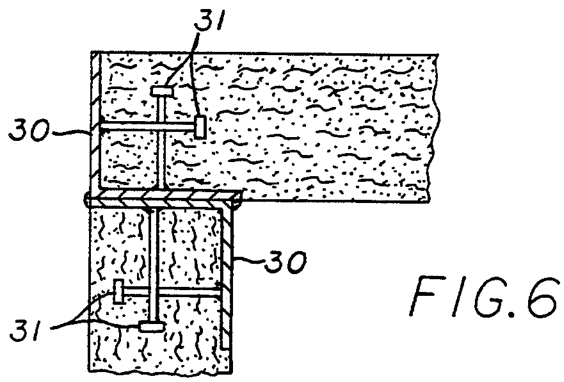
FIG. 6 is a detail in cross section of a corner joint of the modular panels of FIG. 6.

Alternatively, as seen in FIGS. 5 and 6, the enclosure or vault V2 may be formed in individual precast panels of the cement-based slurry infiltrated concrete and welded together at the installation site. The bottom wall 10, end walls 11, and side walls 12 are formed (described hereinafter) with L-shaped longitudinal metal angles 30 placed in the form prior to infiltrating the fibers with the cement-based slurry, such that the angles 30 form the corners or edges of the panels which are to be joined by welding. The metal angles 30 are provided with headed anchor studs 31 which extend inwardly to become securely imbedded in the concrete when it cures (FIG. 6).

Figure 7:
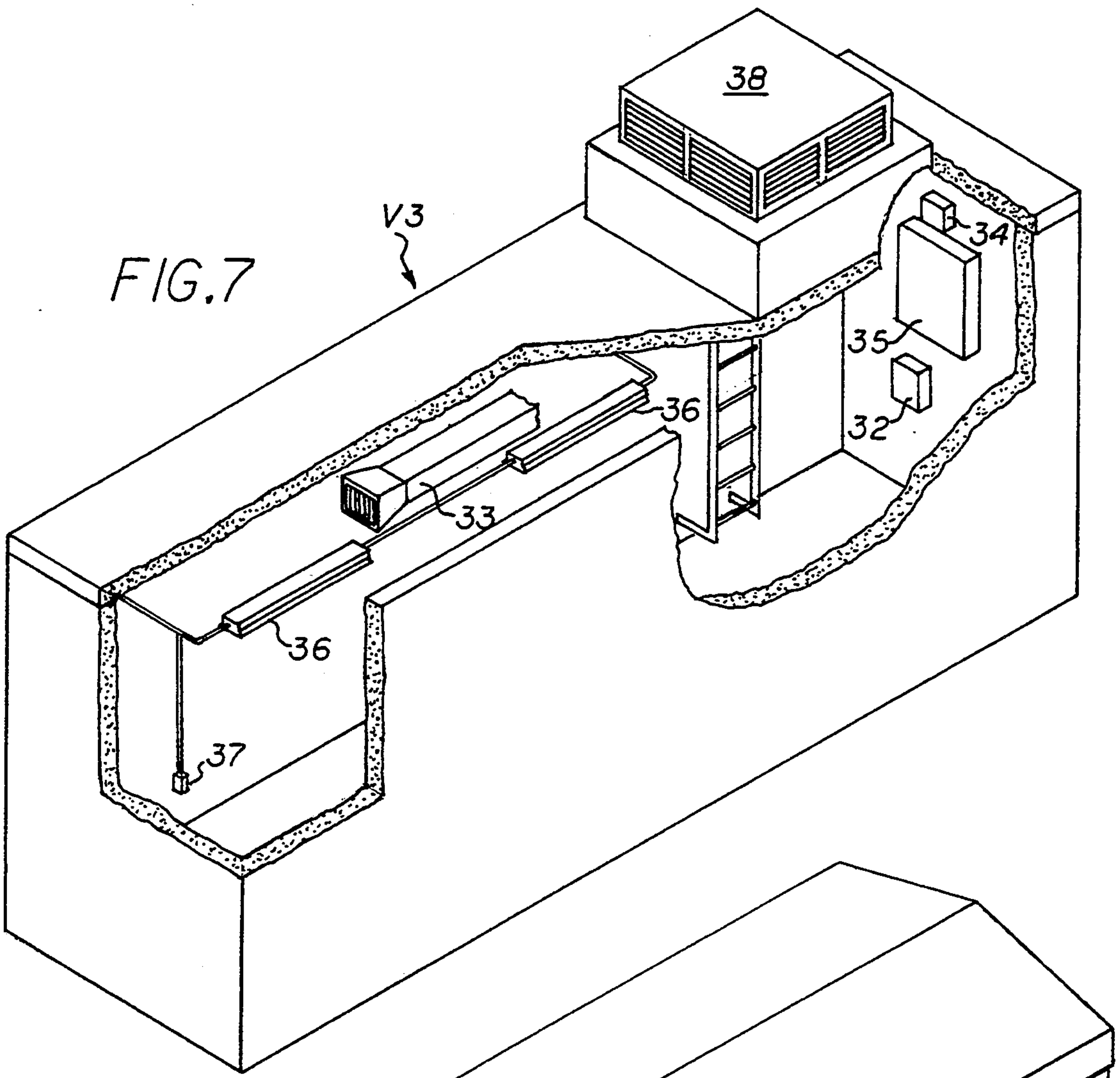
FIG. 7 is a perspective view of a controlled environment enclosure.

FIG. 7 shows a controlled environment vault V3 formed of cement-based slurry infiltrated concrete which may be used for housing communication equipment, such as telephone, computer, or surveillance equipment, etc., which requires a controlled environment for proper operation. The controlled environment vault V3 may contain temperature control equipment, such as; dehumidifiers 32, fresh air blowers 33, environment monitors and alarms 34, electrical control panels 35, electrical lights 36 and electrical outlets 37, and other devices associated with controlling the environment within the enclosure. The controlled environment vault V3 may be partially buried with an entry hatch 38 above ground.

Figure 8:
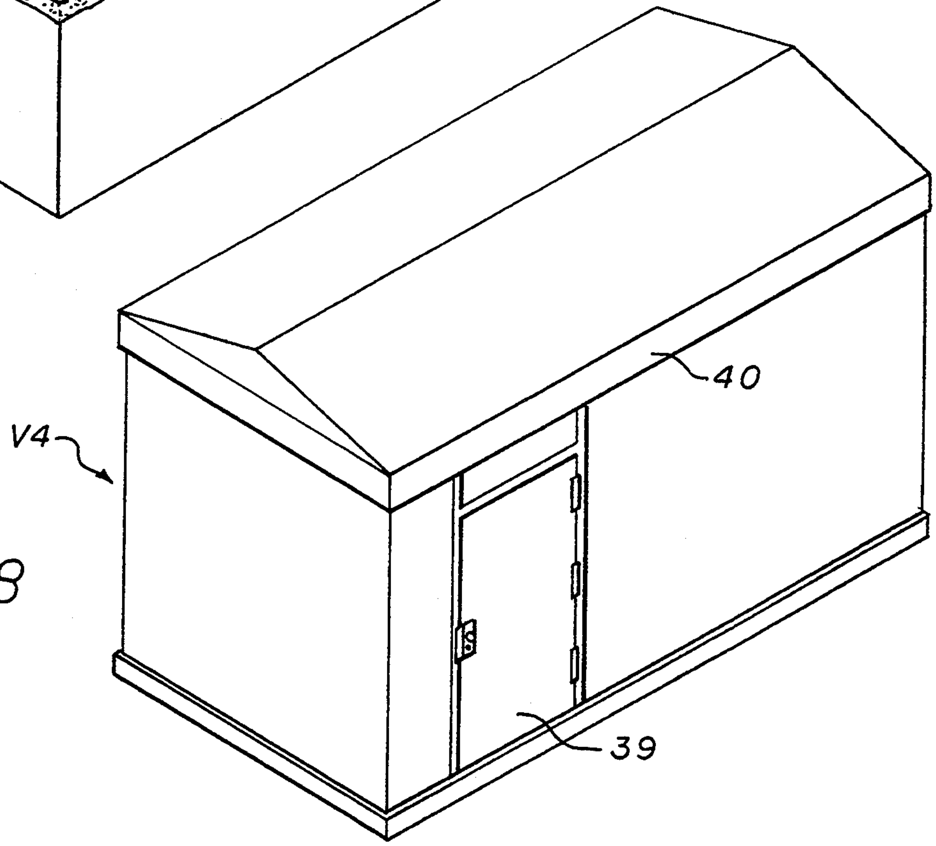
FIG. 8 is a perspective view of a high security utility building enclosure.

FIG. 8 shows a high security utility building V4 formed of cement-based slurry infiltrated concrete which may be used for storing volatile explosives and weapons, or other purposes where high-strength and security is a factor. The utility building V4 is substantially impenetrable (bullet-proof) and explosion proof, and may be installed above ground and provided with steel doors 39 and a steel roof 40.

Figure 9:
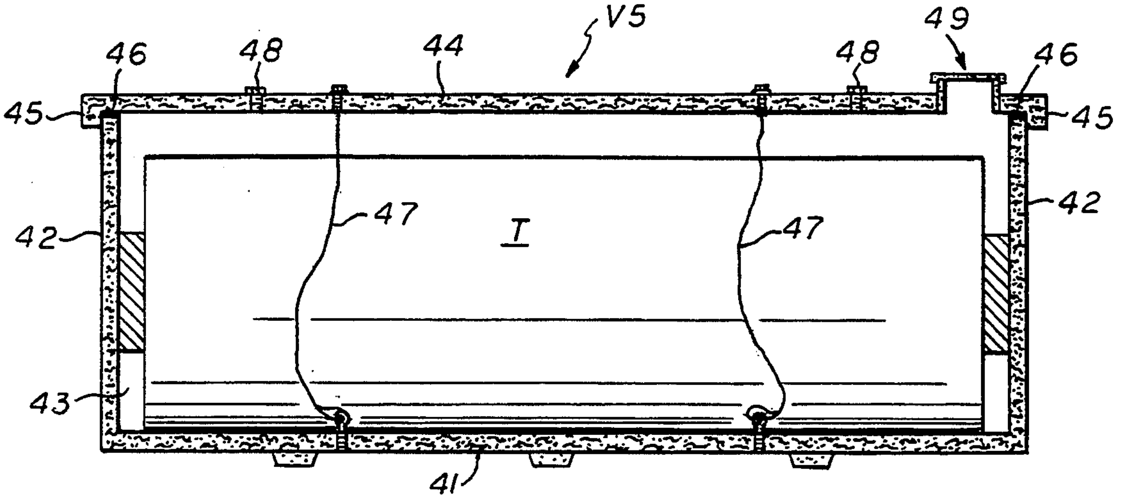
FIG. 9 is a longitudinal cross section of an explosion relief containment vault.

FIG. 9 shows, somewhat schematically, an explosion relief containment vault V5. The explosion relief containment. vault V5 is preferably a box-like monolithic structure having a bottom wall 41, opposed end walls 42, and opposed side walls 43. The structure is provided with an explosion relief roof or lid 44 which is also preferably a monolithic construction having depending side edges 45 which overlap the end walls 42 and side walls 43. An explosion relief containment vault in accordance with the present invention may be used for storing fuel tanks, volatile explosives, nuclear weapons, test devices, and weapons components. In the example illustrated, a fuel storage tank T is shown inside the vault V5.

The explosion relief roof or lid 44 is placed on top of the open end of the vault V5. Suitable seals or gaskets 46 are installed between the top surface of the walls 42,43 and the bottom surface of the lid 44. One or more elongate tie-down cables 47 are secured at their lower end to the bottom wall 41 by eyebolts anchored in the bottom wall and at their other end to the roof or lid 44 by bolt fasteners anchored in the lid. In the event of an explosion inside the vault, the roof or lid 44 would blow off, but would be restrained by the cables 47. Pressure relief bolts or fasteners 48 may also be installed in the roof or lid 44 which would blow out upon a predetermined pressure inside the vault. The roof or lid 44 may also be provided with various apertures, such a manhole access port or hatch 49 which allows access to the interior by workers to conduct testing or other operations inside the vault.

Figure 10:
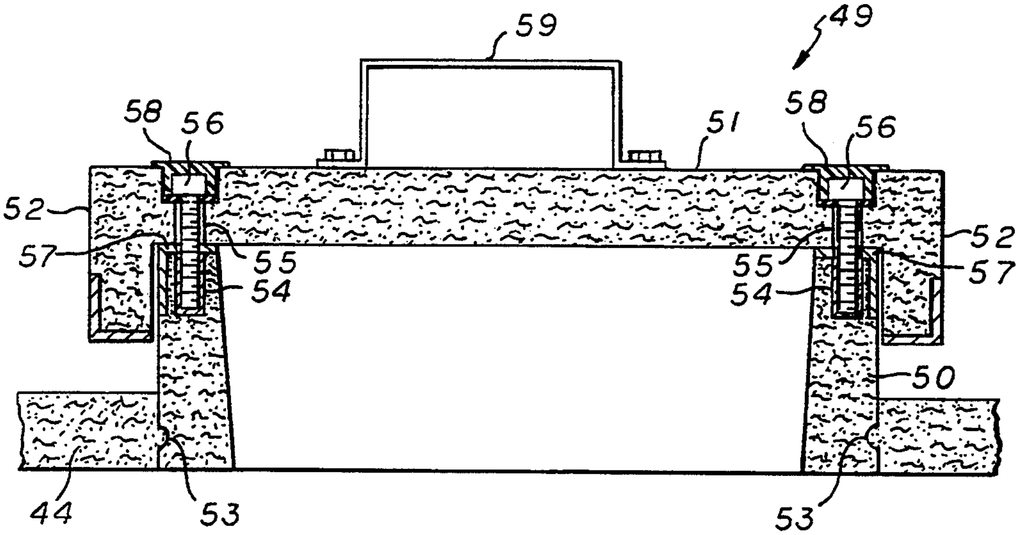
FIG. 10 is a partial cross section of an access hatch formed in the roof or lid of a vault.

One type of hatch 49 is shown in partial cross section in FIG. 10. The hatch 49 comprises a cylindrical or polygonal collar 50 and a mating cover 51 having depending side edges 52 which overlap the side wall(s) of the collar. The collar 50 may be formed as a separate unit which, after it has been cast and cured, is cast into the lid 44 when it is formed. A peripheral groove 53 may be formed in the collar 50 to facilitate securement to the roof or lid 44 during casting. Laterally extending eyebolts may also be used for this purpose. The peripheral groove arrangement also serves as a water barrier. Threaded inserts 54 may be cast into the top end of the collar 50 and holes 55 formed in the cover member to receive bolts 56 for bolting the cover 51 to the collar 50. Suitable seals or gaskets 57 are installed between the top surface of the collar 50 and the bottom surface of the cover 51. Plastic plugs 58 may be installed over the bolt heads. A handle 59 may also be formed into the cover 51 or bolted to its top surface.

Materials of Construction

The preferred environmental enclosure structures are made of a cement-based slurry infiltrated fiber composite material similar to a material known as "SIFCON" a relatively new concrete composite being developed by the New Mexico Engineering Research Institute of the University of New Mexico in Albuquerque, New Mexico (NEMERI). SIFCON utilizes short steel fibers in a Portland cement based matrix. It should be noted that "SIFCON" and the present invention differs significantly from conventional "steel fiber reinforced concrete" (SFRC), as explained below.

In the conventional "steel fiber reinforced concrete" (SFRC) process, the steel fibers are added directly to a typical concrete mix in the ratio of 0.5% to 1.5% by volume. On the other hand, the "SIFCON" process and the present invention starts with a bed of pre-placed steel fibers in the range of 5% to 20% by volume and then infiltrates the dense fiber bed with a low viscosity, cement-based slurry composition.

The steel fibers used in the present environmental enclosure structures are manufactured from drawn wire or cut from thin steel sheets. The steel fibers may be provided in several different lengths and diameters, and may have some type of deformation to aid in mechanical bonding. The present environmental enclosure structures may utilize a bed of pre-placed steel fibers in the range of 4% to 25% by volume, with the preferred fiber volume density being in the range of about 5% to 10% by volume. Each fiber is preferably approximately 2.36" long and 0.03" in diameter with a deformed end. The preferred cement-based slurry ingredients are Portland cement, fly ash, and water, and a fine sand may be included. In addition, a high-range water reducer or "superplasticizer" is used to increase the fluidity of the slurry. Other ingredients, such as microsilica (silica fume), latex modifiers, polymers, and other common concrete additives may be used in the cement-based slurry mixes.

The bed of fibers may also be formed of one or more blankets or mats of generally continuous strands of fibrous material having a fiber volume density in the range of from about 4% to 25%, with the preferred fiber mat having a fiber volume density of from about 5% to 10% and each strand of the fibrous material approximately 0.008" to 0.030" in diameter. The length of the strands in the mats may range from about 4" to 30".

Figure 11:
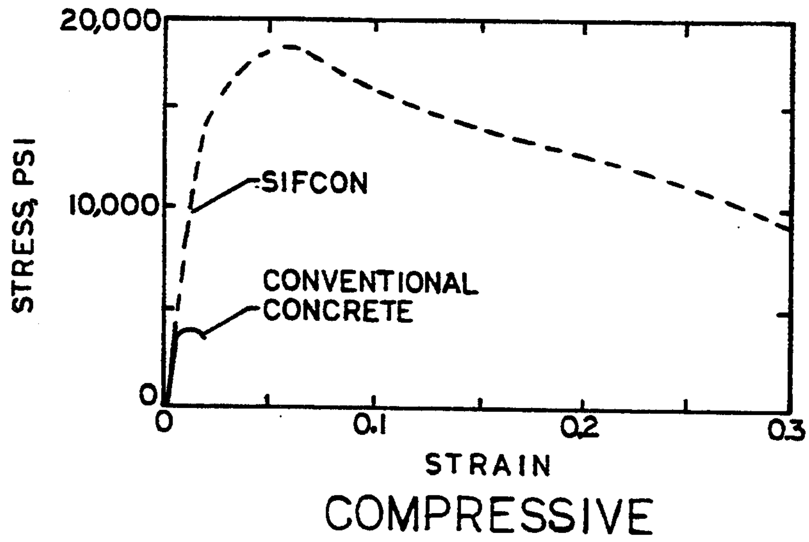
FIG. 11 is a chart showing the compressive strength of SIFCON material compared to conventional concrete.
Figure 12:
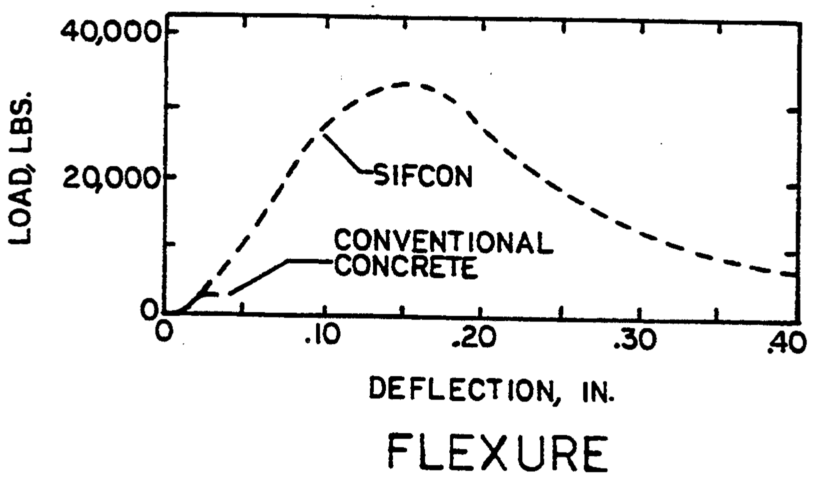
FIG. 12 is a chart showing the flexure of SIFCON material compared to conventional concrete.
Figure 13:
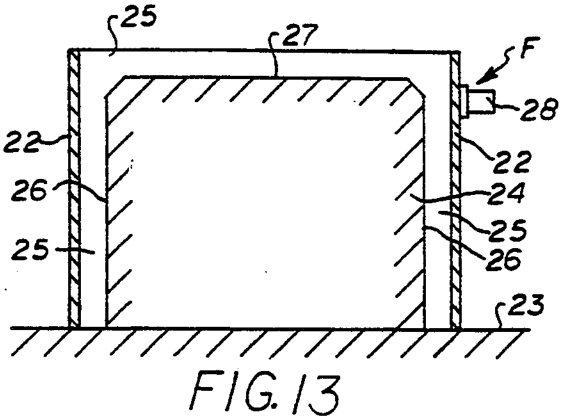
FIGS. 13, 14, 15, 16, 17, and 18 are cross sections illustrating schematically various stages in the method of forming a monolithic enclosure.

The resulting "cement-based slurry infiltrated fiber" and "fiber mat" composite structure has a much higher compressive strength, toughness, and ductibility than conventional concrete. A general comparison of the differences between "SIFCON" and conventional concrete in compressive strength is illustrated graphically in FIG. 11, and the differences in the flexural properties is shown in FIG. 12. Compressive strengths in the range of 15,000 to 30,000 psi are common for "SIFCON" and it's shear and flexural capacity is generally 10 to 20 times higher than conventional concrete.

The present environmental enclosure structures may also be made of a cement-based slurry infiltrated fiber composite material which utilizes short fibers or fibrous mats of other organic or inorganic material such as; other metals, glass, plastics, aramids, carbon, and boron, or combinations thereof. In some applications, the structures may also be made of a cement-based slurry infiltrated fiber composite material which utilizes short fibers or fibrous mats of epoxy-coated steel fibers.

Although the illustrated examples of the environmental enclosure structures are shown as box-like configurations, it should be understood that the structures may be cylindrical or various other shaped configurations.

As with the steel fibers, the organic and/or inorganic fibers or fiber mats are placed to form a bed of fibers in the range of 4% to 25% by volume and then infiltrated with a low viscosity, cement-based slurry composite. The cement-based slurry may also include: refractory castables, castable plastics and epoxies, or clay based slurries.

Method of Manufacture

Referring now to FIGS. 13 through 18, there is shown a typical wood or steel mold or form F which is used to form a monolithic structure having four side walls 22 joined together to form a hollow rectangular or square box construction open at the top and bottom ends which is supported on a flat surface 23. The side walls 22 are spaced outwardly from a central box-like core member 24 and extend above the core to form a cavity 25 surrounding the sides and top end of the core. Since the cement-based slurry has a relatively low viscosity, all joints and holes should be sealed with caulking or other sealing material to insure that the form is watertight.

It should be understood that the core member 24 may be shaped in any suitable configuration to form the interior of the product to be molded. However, for purposes of illustration and discussion, the core member 24 is shown to be a square box-like construction having four opposed side walls 26 and a top end wall 27, and the product to be formed by the present method will be described as a simple box configuration, such as those used forming the vault depicted in FIG. 1.

Small pneumatic vibrators 28 of the type used on bulk cement hoppers, spaced about 6 ft. on centers on one side of the form may optionally be used when forming walls up to 8 inches thick. For thicker walls, small vibrators on both sides of the wall or larger external form vibrators could be used.

Figure 14:
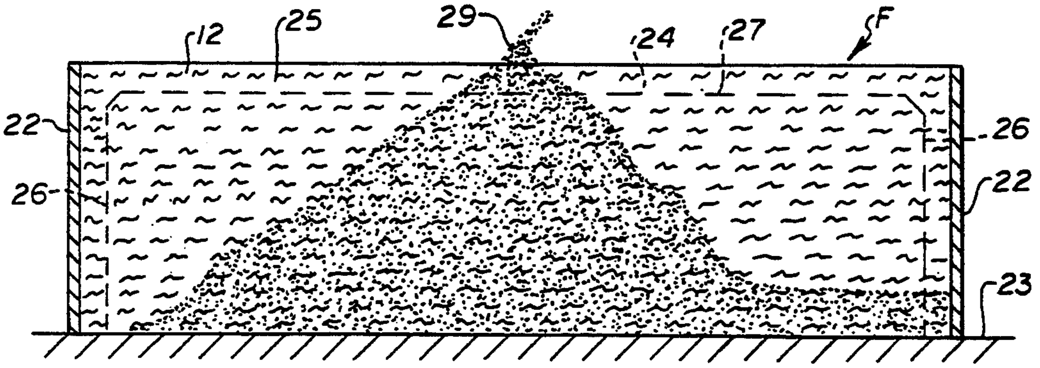

The short fibers of steel, or other organic or inorganic material are sprinkled either by hand or mechanical means into the cavity 25 surrounding the core 24. The form F is completely filled to the top with fibers (FIG. 14). A major consideration for placing the fibers in the form is that they must be allowed to fall freely as individual fibers into the form. This allows the fibers to interlock forming a continuous uniform mass.

Figure 17:
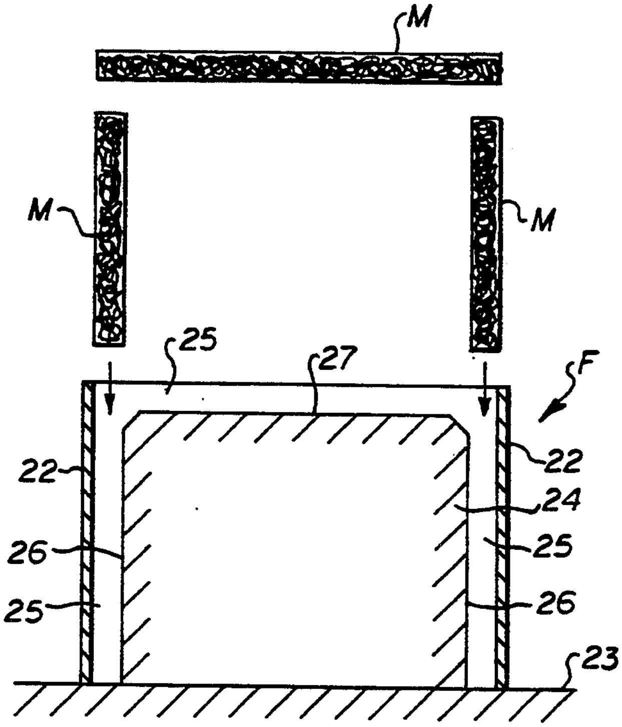

Alternatively, as seen in FIG. 17, one or more blankets or mats M of generally continuous strands of fibrous steel or other organic or inorganic material are placed either by hand or mechanical means into the cavity 25 surrounding the core 24 to completely fill the form F. The fiber mats are placed in the form to form a continuous uniform mass or fiber bed.

Depending upon the geometric properties of the particular fiber being used, and to a lesser degree on the geometry of the form, a specific fiber volume density will be achieved. The preferred fiber volume density is in the range of 5% to 10%.

After the fibers or fiber mats have been placed, the low viscosity cement-based slurry 29 is mixed and infiltrated into the fiber bed, filling the spaces between the fibers (FIG. 14). The cement-based slurry ingredients should be thoroughly mixed to insure that there are no lumps of cement or fly ash which would block the opening in the fiber bed and restrict the infiltration of the cement-based slurry.

Figure 18:
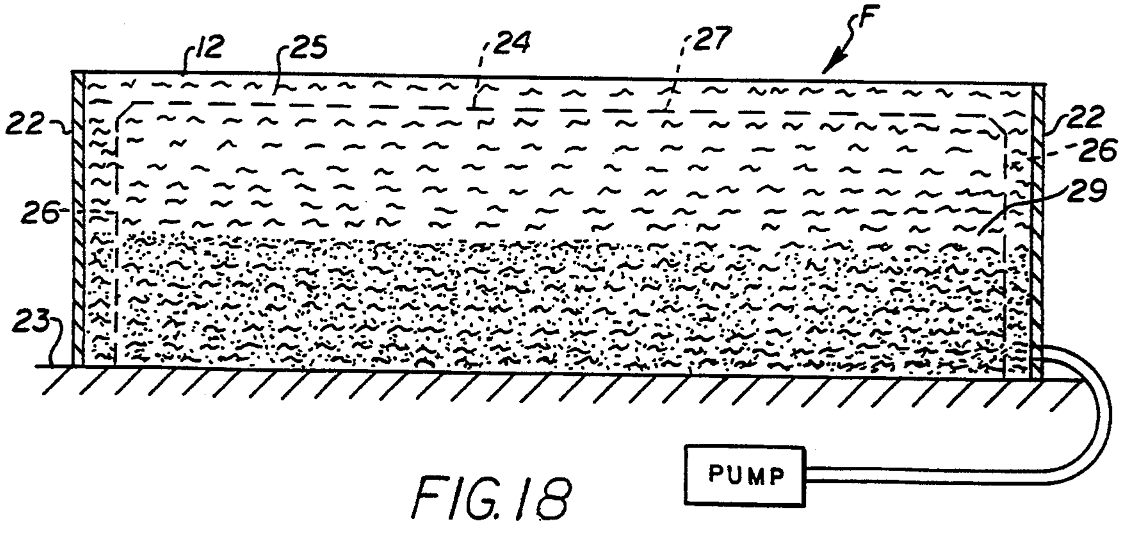
Figure 19:
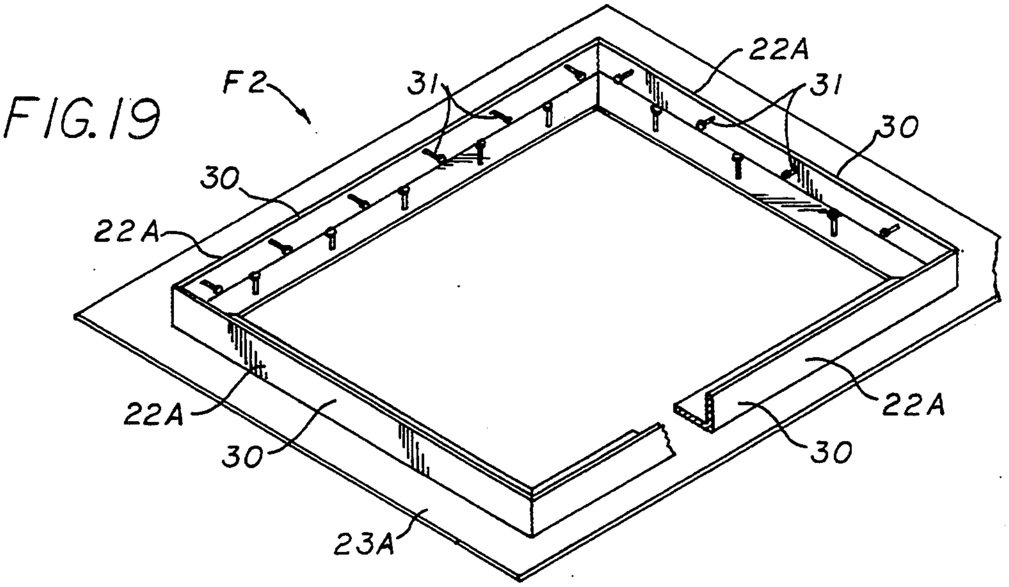
FIGS. 19, 20, 21, and 22, are schematic illustrations showing various stages in the method of forming the panels of a modular enclosure.

FIG. 14 shows the cement-based slurry being added to the fiber bed by pouring or pumping it into the cavity from the top. However, as shown in FIG. 18, another preferred method is to pump the cement-based slurry mixture under pressure into the lower portion of the cavity to completely infiltrate the spaces between the fibers from the bottom of the bed of fibers to the top thereof and fill the cavity surrounding the core member and above the core member. This method reduces the likelihood of forming voids in the material and facilitates complete infiltration of the fiber bed.

The cement-based slurry mixture proportions can vary, depending upon the desired strength or other physical properties of the finished structure. In addition, form geometry, fiber type, and the particular method of placing the cement-based slurry can also determine certain mixture parameters. Preferred cement—fly ash—sand proportions range from 90-10-0 to 30-20-50, respectively, by weight. The preferred ratio of water to cement plus fly ash is from 0.45 to 0.20 and the amount of superplasticizer is from 0 to 40 ounces per 100 pounds of cement plus fly ash. Due to variations in types of cement, fly ash, and sand in various locales, and the various brands of superplasticizers available, it is advisable to determine the cement-based slurry mix proportions by trial batch methods using the available materials.

The cement-based slurry should remain in a fluid state for a relatively long time sufficient to allow the slurry to flow through and fully infiltrate the fiber bed. If a form vibrator is used, the form is vibrated sufficiently to insure complete infiltration, eliminate voids, and compact the cement-based slurry.

Figure 15:
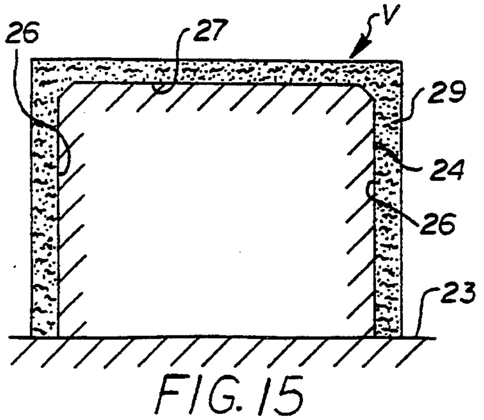

After the concrete has sufficiently cured, the form walls 22 surrounding the core 24 are carefully removed so as not to damage the shape formed thereby (FIG. 15). The curing procedures are the same as for conventional concrete. Depending upon the application, water spray or fogging, wet burlap, waterproof paper, plastic sheeting, or liquid membrane compounds can be used.

Figure 16:
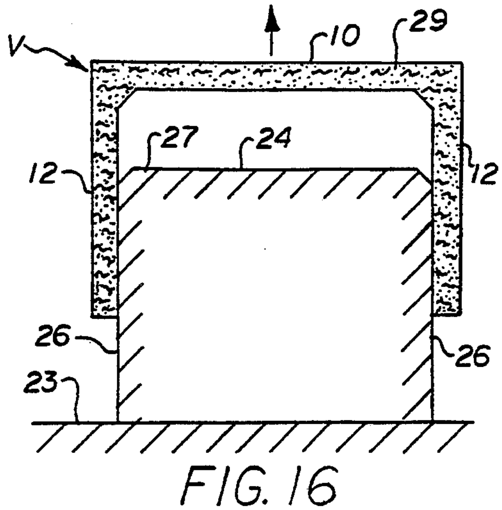

After the structure has cured, it is lifted off the core 24 (FIG. 16). A coating of a penetrating concrete sealer is then applied to all surfaces of the structure. This will also minimize the staining and rusting of the fibers exposed on the surface of embodiments using steel fibers.

Referring now to FIGS. 19 through 22, there is shown a typical mold or form F2 which is used to form a modular structure. The form F2 has four side walls 22A made of elongate metal angles 30 having an L-shaped cross section joined together to form a rectangular or square box frame open at the top and bottom ends which is supported on a flat surface 23A. The angles 30 have headed anchor studs 31 extending inwardly toward the frame interior.

Figure 20:
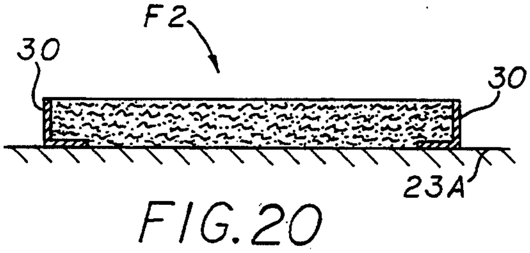

The short fibers of steel, or other organic or inorganic material are sprinkled either by hand or mechanical means into the center of the frame form F2. The form F2 is completely filled to the top with fibers (FIG. 20). A major consideration for placing the fibers in the form is that they must be allowed to fall freely as individual fibers into the form. This allows the fibers to interlock forming a continuous uniform mass.

Figure 21:
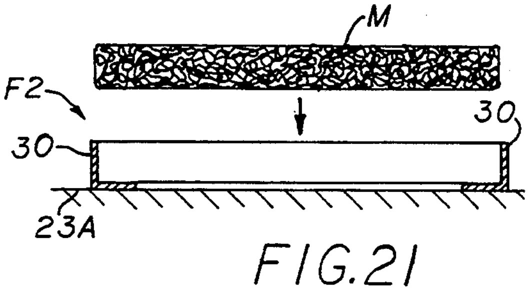

Alternatively, as seen in FIG. 21, one or more blankets or mats M of generally continuous strands of fibrous steel or other organic or inorganic material are placed either by hand or mechanical means into the center of the frame form F2 to completely fill the form F. The fiber mats M are placed in the form to form a continuous uniform mass or fiber bed.

Depending upon the geometric properties of the particular fiber being used, and to a lesser degree on the geometry of the form, a specific fiber volume density will be achieved. The preferred fiber volume density is in the range of 5% to 10%.

After the fibers or fiber mats have been placed, the low viscosity cement-based slurry 29 is mixed and infiltrated into the fiber bed, filling the spaces between the fibers. The slurry ingredients should be thoroughly mixed to insure that there are no lumps of cement or fly ash which would block the opening in the fiber bed and restrict the infiltration of the slurry. The fiber density and slurry mixture proportions are the same for the individual panels as for the monolithic structure described previously, but may be varied depending upon the desired strength or other physical properties of the finished structure. In addition, form geometry, fiber type, and the particular method of placing the cement-based slurry can also determine certain mixture parameters. The preferred general fiber orientation for the bottom, side, and top panels is in a generally horizontal direction, to resist loadings normal to the plane of the panel.

The cement-based slurry should remain in a fluid state for a relatively long time sufficient to allow the slurry to flow through and fully infiltrate the fiber bed. If a form vibrator is used, the form is vibrated sufficiently to insure complete infiltration, eliminate voids, and compact the cement-based slurry.

Figure 22:
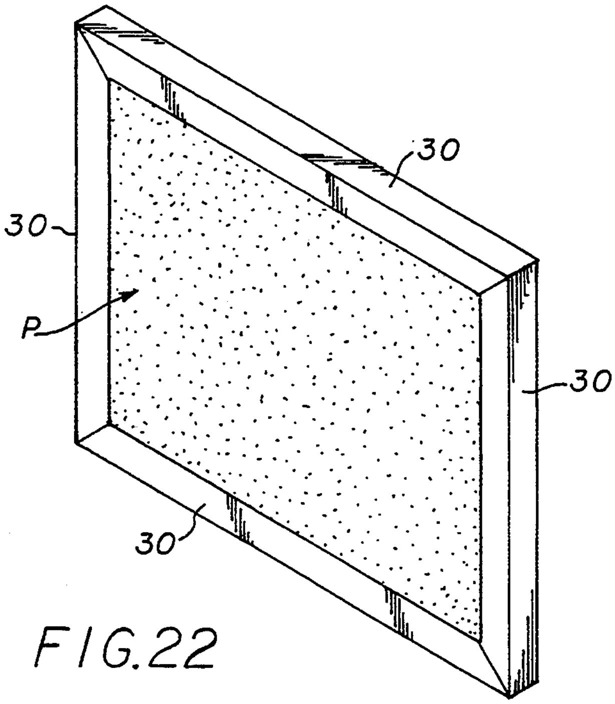

After the concrete has sufficiently cured, the angles 30 defining the frame become secured to the concrete and form a metal perimeter surrounding the hard panel P (FIG. 22). The curing procedures are the same as for conventional concrete. Depending upon the application, water spray or fogging, wet burlap, waterproof paper, plastic sheeting, or liquid membrane compounds can be used.

After the panel P has cured, it is lifted off the horizontal surface 23A. A coating of a penetrating concrete sealer is then applied to all surfaces of the structure. This will also minimize the staining and rusting of the fibers exposed on the surface of embodiments using steel fibers. The panels can be easily transported to the installation site where they are placed end-to-end or edge-to-edge with the metal angles on each panel engaged with the angle on the abutting panel and then field welded together to form the enclosure walls.

Preliminary design studies on the present cement-based slurry infiltrated fiber environmental vault system have been conducted by the New Mexico Engineering Research Institute of the University of New Mexico in Albuquerque, New Mexico (NMERI). A monolithic vault structure was analyzed as an underground rigid frame using a soil load equivalent to a fluid density of 95 pcf. Because the vault was to be cast as a monolithic unit, special consideration was given to the direction of load application as compared to the orientation of the structural element. The fiber used in this design study was a "Dramix ZL 60/80" fiber, made by Bekaert Wire Company, which was found to produce a SIFCON with the highest ratio of flexural capacities in the two orthogonal directions. The following SIFCON properties were used in the design:

For vertical elements (load perpendicular to gravity axis):

Unconfined axial compression: 10,000 psi
Modulus of rupture: 1,800 psi
Shear: 3,000 psi For horizontal elements (load parallel to gravity axis):

Unconfined axial compression: 15,000 psi
Modulus of rupture: 5,800 psi
Shear: 4,500 psi It was found that for a cement-based fiber composite structure having the recited material properties, the side wall thickness need only be 4.5" at the bottom and, for economy and as an aid in fabricating the vault, the wall could be tapered to a thickness of 4" at the top of the wall. The required minimum thickness for the bottom wall was calculated. to be slightly larger than 4". To allow for any spilled fuel to flow to a low point in the floor, the bottom wall surface can be sloped upward to the sides for a thickness of 4.5" at the corner fillet.

On the other hand, a vault fabricated using conventional pre-stressed concrete would require a wall thickness of 8" to 10" to meet the structural design requirements for resisting these same soil loading conditions.

Thus, the environmental enclosure structures of the present invention formed of a cement-based slurry infiltrated fiber allows the enclosure to have thinner walls and a gross weight significantly less than conventional reinforced and pre-stressed concrete enclosures of the same size, and has greater compressive strength, toughness, and ductibility, and a much higher bending capacity approximating that of structural steel.

While this invention has been described fully and completely with special emphasis upon several preferred embodiments, it should be understood that within the scope of the appended claims the invention may be practiced otherwise than as specifically described herein.

I claim:

1. An improved environmental enclosure structure for containing and protecting hazardous materials, explosives, telecommunications equipment, and the like, the improved environmental enclosure structure comprising:

a cement-based fiber composite bottom wall, at least one cement-based fiber composite side wall, and a top wall defining an interior volume configured to receive and enclose hazardous materials, explosives, telecommunications equipment, and the like; and said cement-based fiber composite bottom wall and said cement-based fiber composite side wall each containing a uniform continuous mass of individual interlocked fibers completely infiltrated by and embedded in a cementious matrix mixture of Portland cement, fly ash, water, and a water-reducing superplasticizer and having a fiber volume density in the range of from about 4% to about 25%.

2. The improved environmental enclosure structure according to claim 1, including a surface coating of penetrating concrete sealer material on said cement-based fiber composite bottom wall, said at least one cement-based fiber composite side wall, and said top wall.

3. The improved environmental enclosure structure according to claim 1, in which said environmental enclosure structure is a monolithic structure having a contiguous bottom wall and at least one side wall integrally formed therewith, and a removable top wall.

4. The improved environmental enclosure structure according to claim 1, in which said environmental enclosure structure is a box-like structure having a cement-based fiber composite bottom wall, opposed cement-based fiber composite end walls, and opposed cement-based fiber composite side walls, each containing the recited materials.

5. The improved environmental enclosure structure according to claim 4, in which said bottom wall, said opposed end walls, and said opposed side walls are formed of individual cement-based fiber composite panels containing the recited materials and joined together to define said box-like structure.

6. The improved environmental enclosure structure according to claim 1, including a cement-based fiber composite beam surrounding said at least one side wall and being of sufficient weight to prevent up-lift of said structure due to the effect of buoyancy forces when said structure is installed underground in soil and subjected to a relatively high ground water condition.

7. The improved environmental enclosure structure according to claim 1, in which said cement-based fiber composite bottom wall extends outwardly a distance from said at least one side wall to provide a base extension of sufficient size such that when said structure is installed underground said side wall and said base extension will be buried in the soil to prevent up-lift of said structure due to the effect of buoyancy forces when said structure is subjected to a relatively high ground water condition.

8. The improved environmental enclosure structure according to claim 1, in which said mass of fibers are selected from the group of materials consisting of metal, steel, glass, plastic, and aramids.

9. The improved environmental enclosure structure according to claim 1, in which said mass of fibers are selected from the group of materials consisting of carbon and boron.

10. The improved environmental enclosure structure according to claim 1, in which each of said individual fibers is approximately 2.36" long and 0.03" in diameter with a deformed end.

11. The improved environmental enclosure structure according to claim 1, in which said cement-based fiber composite bottom wall and said cement-based fiber composite side wall each has a fiber volume density in the range of from about 5% to about 10%.

12. The improved environmental enclosure structure according to claim 1, in which said cement-based fiber composite bottom wall and said cement-based fiber composite side wall each contain one or more mats of individual interlocked strands of fibrous material completely infiltrated by and embedded in a cementious matrix mixture of Portland cement, fly ash, water, and a water-reducing superplasticizer and have a fiber volume density in the range of from about 4% to about 25%.

13. The improved environmental enclosure structure according to claim 12, in which each fiber strand of said fibrous material mat has a diameter of from about 0.008" to about 0.3".

14. The improved environmental enclosure structure according to claim 12, in which each fiber strand of said fibrous material mat is approximately 0.03" in diameter.

15. The improved environmental enclosure structure according to claim 12, in which each fiber strand of said fibrous material mat has a length of from about 4" to about 30".

16. The improved environmental enclosure structure according to claim 1, in which said cementious matrix mixture includes fine grain sand.

17. The improved environmental enclosure structure according to claim 1, in which said cementious matrix mixture includes additives selected from the group consisting of microsilica, latex modifiers, polymers, refractory castables, castable plastics, epoxies, and clay.

18. The improved environmental enclosure structure according to claim 1, in which said cementious matrix mixture includes fine grain sand and additives selected from the group consisting of microsilica, latex modifiers, polymers, refractory castables, castable plastics, epoxies, and clay.

19. The improved environmental enclosure structure according to claim 1, in which said cementious matrix mixture comprises a mixture by weight of;

Portland cement from about 30% to about 90%,
fly ash from about 10% to about 20%,
fine grain sand from 0 to about 50%, water in a ratio of water to the sum of cement and fly ash of from about 0.20 to about 0.45, and a water-reducing superplasticizer in a ratio of superplasticizer to the sum of cement and fly ash of from 0 to about 40 ounces per 100 pounds of the sum of cement and fly ash.

20. The improved environmental enclosure structure according to claim 19, in which said cementous matrix mixture further includes additives selected from the group consisting of microsilica, latex modifiers, polymers, refractory castables, castable plastics, epoxies, and clay.

21. The improved environmental enclosure structure according to. claim 1 wherein said improved environmental enclosure structure is a secondary containment vault for use in isolating material storage containers and containing materials leaked therefrom, and said cement-based fiber composite bottom wall, said at least one cement-based fiber composite side wall, and said top wall define an interior volume configured to receive and enclose a container of hazardous material and the interior volume exceeding the volume capacity of the hazardous material container.

22. The improved environmental enclosure structure according to claim 1 wherein said improved environmental enclosure structure is a controlled environment vault for use in isolating and protecting electronic and telecommunications equipment and the like from a hostile environment;

said cement-based fiber composite bottom wall, said at least one cement-based fiber composite side wall, and said top wall define an interior chamber configured to receive and enclose electronic and telecommunications equipment and the like which require a controlled environment; and including temperature control means and means associated therewith within said interior chamber for controlling the environment within said interior chamber.

23. The improved environmental enclosure structure according to claim 1 wherein said improved environmental enclosure structure is an explosion resistant structure for use in storing volatile materials, explosives, weapons and the like, said cement-based fiber composite bottom wall, said at least one cement-based fiber composite side wall, and said top wall define an interior chamber configured to receive and enclose volatile materials, explosives, weapons and the like, and said cement-based fiber composite bottom wall, said at least one cement-based fiber composite side wall, and said top wall are of sufficient thickness and strength to be substantially bullet-proof and explosion resistant.

24. The improved environmental enclosure structure according to claim 23 wherein said top wall is removably disposed at the top of said at least one cement-based fiber composite side wall and is joined to said at least one cement-based fiber composite side wall and said cement-based fiber composite bottom wall by retaining cable means.

25. An improved cement-based fiber composite panel for use in constructing environmental enclosures, the improved panel comprising;

a generally flat panel of cement-based slurry infiltrated fiber composite material containing a uniform continuous mass of individual interlocked fibers completely infiltrated by and embedded in a cementious matrix mixture of Portland cement, fly ash, water, and a water-reducing superplasticizer and having a fiber volume density in the range of from about 4% to about 25%.

26. The improved cement-based fiber composite panel according to claim 25 including a metal connector on at least one end side edge of said panel, whereby a plurality of said panels may be joined together by securing said metal connectors together to form the bottom wall and side walls of an enclosure.

27. A method of forming a cement-based fiber composite environmental enclosure structure having side walls with a fiber density in the range of from about 4% to about 25% comprising the steps of;

(a) providing a form having side walls joined together to form a frame surrounding a center space open at the top and bottom ends, (b) placing said frame on a generally flat surface to enclose the open bottom end, (c) placing a mass of fibers selected from the group of materials consisting of steel, plastic, aramids, carbon and boron into said cavity to form a bed of fibers interlocked with one another substantially filling said center space and having a fiber volume density in the range of from about 4% to about 25% with spaces between said fibers, (d) after forming the bed of fibers, adding a cement-based composition slurry mixture comprising Portland cement, fly ash, water, and a water-reducing plasticizer into the form components to completely infiltrate the spaces between said fibers and fill the center space defined by the form, (e) allowing the uncured concrete infiltrated bed of fibers to completely cure to form a hard solid mass, and thereafter (f) removing the cured hard solid mass from the flat surface.

28. The method according to claim 27 in which said step of placing a plurality of fibers in said center space comprises placing one or more mats of fibrous material into said center space to form a bed of fibers having a fiber volume density in the range of from about 4% to about 25%.

* * * * *